US011975502B2

(12) United States Patent
Brenaut et al.

(10) Patent No.: US 11,975,502 B2
(45) Date of Patent: May 7, 2024

(54) METHOD FOR FOLDING A CORRUGATED CARDBOARD BLANK INTENDED TO FORM A FOLDED BOX

(71) Applicant: Bobst Lyon, villeurbanne (FR)

(72) Inventors: Maxime Brenaut, Lyons (FR); Guillaume Martin-Bastenaire, Lyons (FR)

(73) Assignee: BOBST LYON, Villeurbanne (FR)

( * ) Notice: Subject to any disclaimer, the term of this patent is extended or adjusted under 35 U.S.C. 154(b) by 0 days.

(21) Appl. No.: 17/597,477

(22) PCT Filed: Jul. 9, 2020

(86) PCT No.: PCT/EP2020/069321
§ 371 (c)(1),
(2) Date: Jan. 7, 2022

(87) PCT Pub. No.: WO2021/005139
PCT Pub. Date: Jan. 14, 2021

(65) Prior Publication Data

US 2022/0266562 A1 Aug. 25, 2022

(30) Foreign Application Priority Data

Jul. 11, 2019 (FR) ....................................... 1907771

(51) Int. Cl.
*B31B 50/36* (2017.01)
*B31B 50/74* (2017.01)
*B31B 100/00* (2017.01)

(52) U.S. Cl.
CPC ............ *B31B 50/36* (2017.08); *B31B 50/741* (2017.08); *B31B 2100/002* (2017.08)

(58) Field of Classification Search
CPC .. B31B 50/36; B31B 50/741; B31B 2100/002
See application file for complete search history.

(56) References Cited

U.S. PATENT DOCUMENTS 3,259,030 A * 7/1966 Crathern, III ........... B31B 50/00
156/216
3,270,628 A * 9/1966 Clem ...................... B31B 50/64
493/283
(Continued)

FOREIGN PATENT DOCUMENTS

| | | |
|---|---|---|
| CA | 2801138 A1 | 7/2013 |
| CN | 104553051 A | 4/2015 |

(Continued)

OTHER PUBLICATIONS

International Search Report dated Oct. 16, 2020 in International Application No. PCT/EP2020/069321 and English Translation (4 pages).

*Primary Examiner* — Andrew M Tecco
*Assistant Examiner* — Nicholas E Igbokwe
(74) *Attorney, Agent, or Firm* — Bookoff McAndrews, PLLC

(57) ABSTRACT

The invention relates to a method for folding a corrugated cardboard blank (1) intended to form a folded box, the method comprising the following series of steps:
i) supplying a blank (1) comprising at least one longitudinal crease (11);
ii) applying a liquid to the longitudinal crease (11) so as to make the corrugated cardboard more flexible at the location of the longitudinal crease (11), the application being performed by means of a liquid application arrangement (130) comprising a liquid-ejection nozzle (134) provided with a liquid outlet;
iii) folding the blank (1) around the longitudinal crease (11);
wherein an aspiration of liquid is produced inside an aspiration compartment (163) of the liquid application arrangement (130) during step ii). The aspiration mak-
(Continued)

ing it possible to remove any excess liquid which might not have been absorbed by the cardboard and/or the cardboard dust produced.

20 Claims, 8 Drawing Sheets

(56) References Cited

U.S. PATENT DOCUMENTS 4,055,110 A * 10/1977 Graham .................. B31B 50/54
493/110
4,883,451 A * 11/1989 Hoy .......................... B31F 1/08
493/396
6,834,849 B2 * 12/2004 Hendle ................... B26F 3/004
270/21.1
8,029,430 B2 * 10/2011 Neubauer ............ B42D 15/008
493/420
10,363,766 B2 * 7/2019 Lacek .................... B42D 1/006
2006/0049065 A1 * 3/2006 Chevalier ............... B31B 50/00
118/123
2010/0304114 A1 12/2010 Stevens et al.
2013/0184135 A1 * 7/2013 Duer ....................... B31B 50/26
493/162
2014/0238295 A1 8/2014 Valle et al.

FOREIGN PATENT DOCUMENTS

CN 108906443 A 11/2018
CN 109049840 A 12/2018
CN 109109378 A 1/2019
JP 49-096897 A 9/1974
JP H02292030 A 12/1990
JP 6-077851 U 11/1994
JP 10-128209 A 5/1998
JP 2008073906 A 4/2008
JP 2010260181 A 11/2010
JP 2013141828 A 7/2013
TW 201420198 A 6/2014
WO 2017121503 A1 7/2017
WO 2018135445 A1 7/2018

* cited by examiner

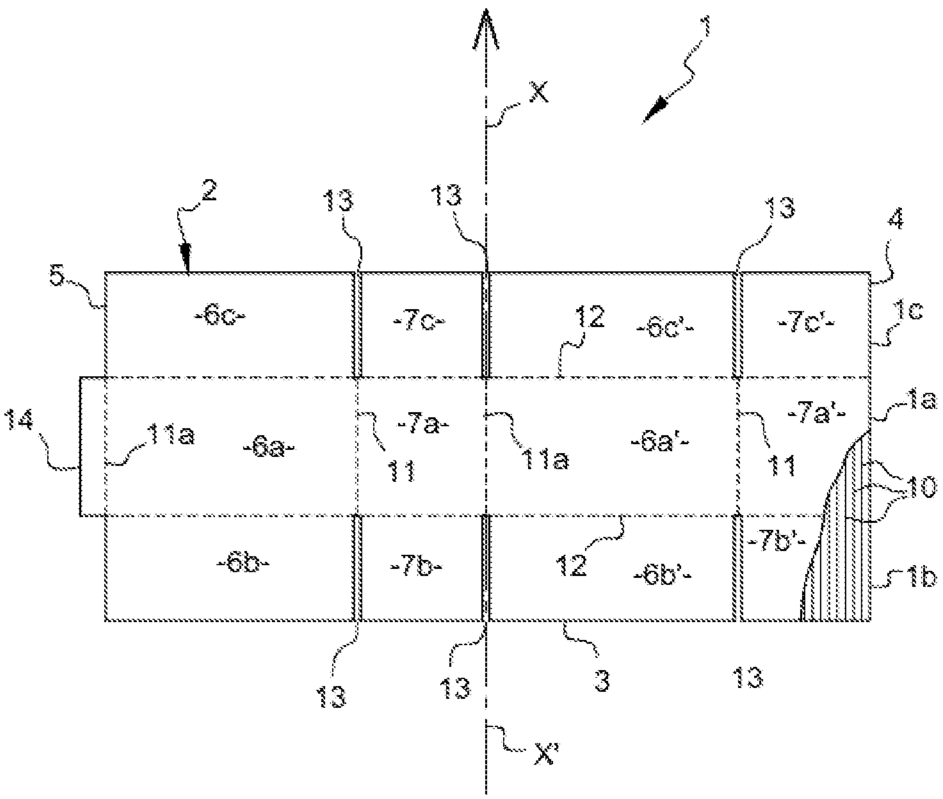
[Fig. 1]

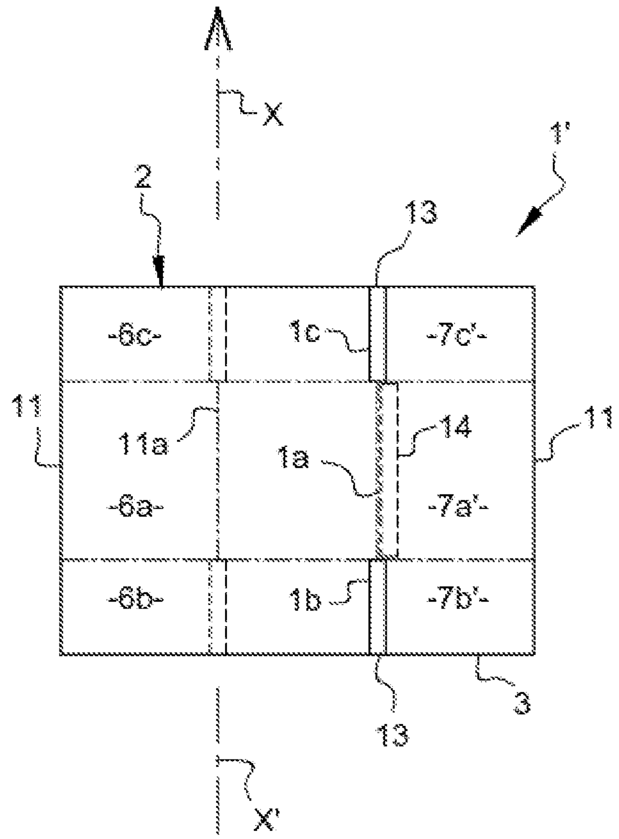
[Fig. 2]

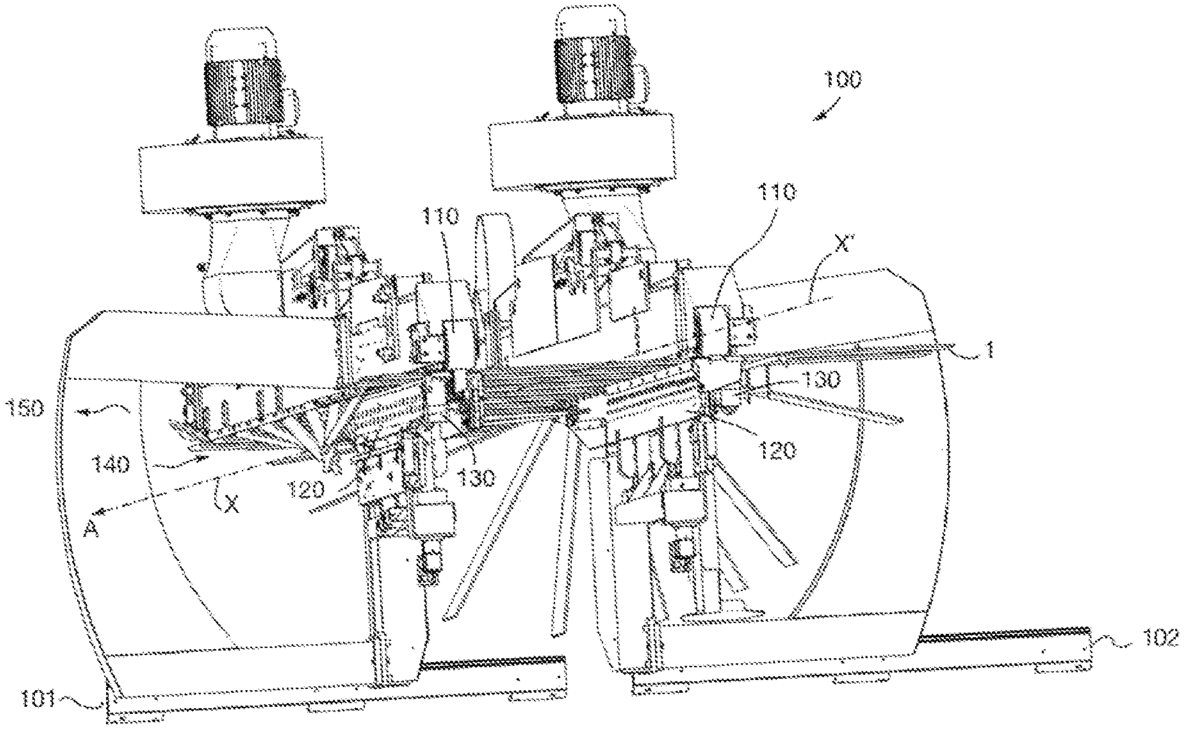
[Fig. 3]

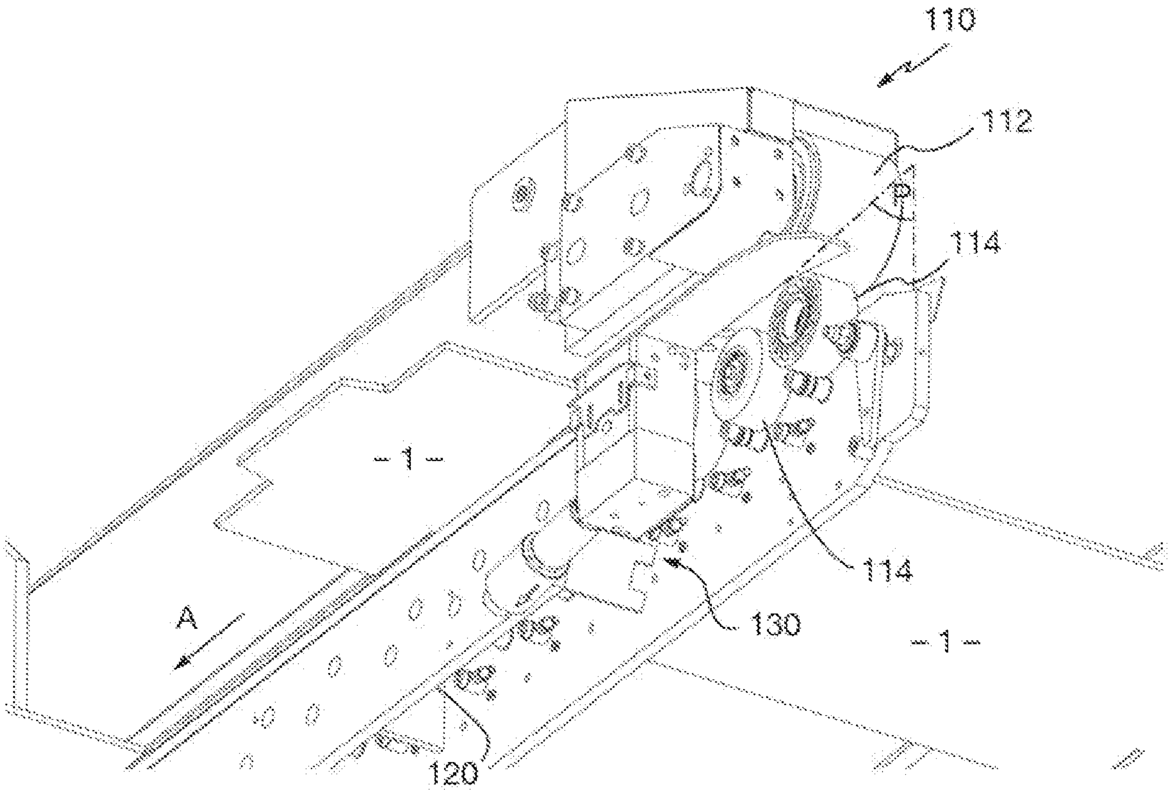
[Fig. 4]

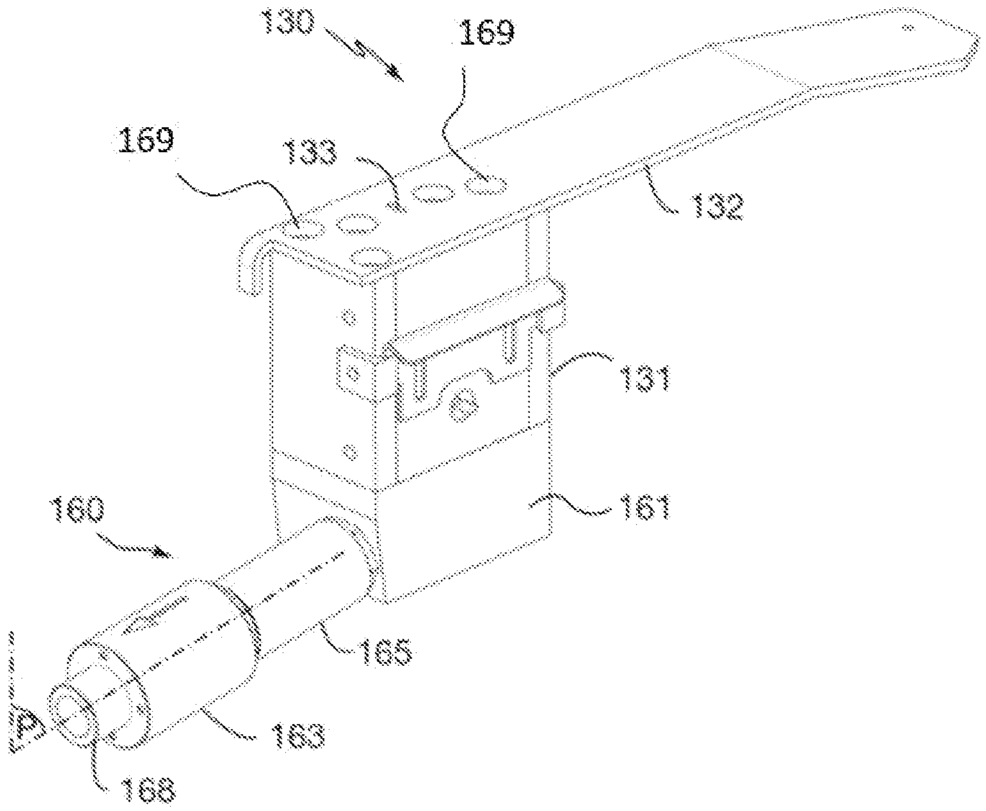
[Fig. 5]

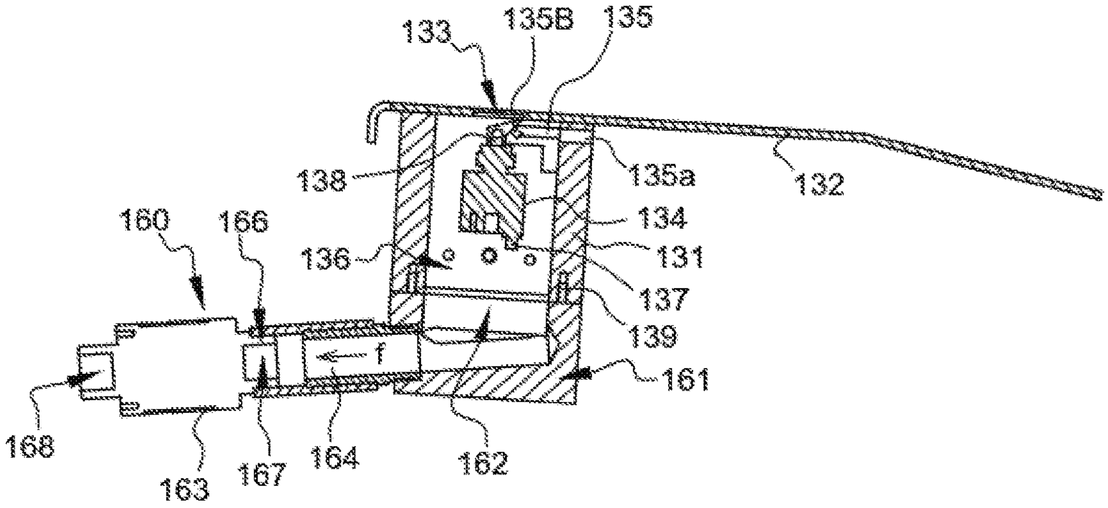
[Fig. 6]
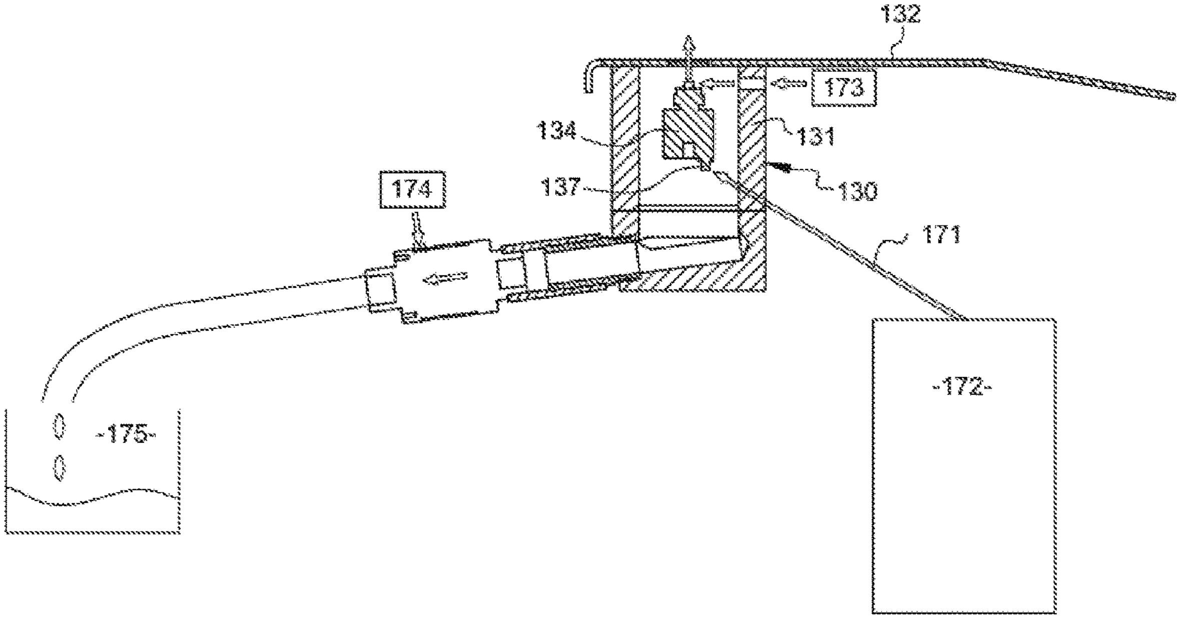
[Fig. 7]

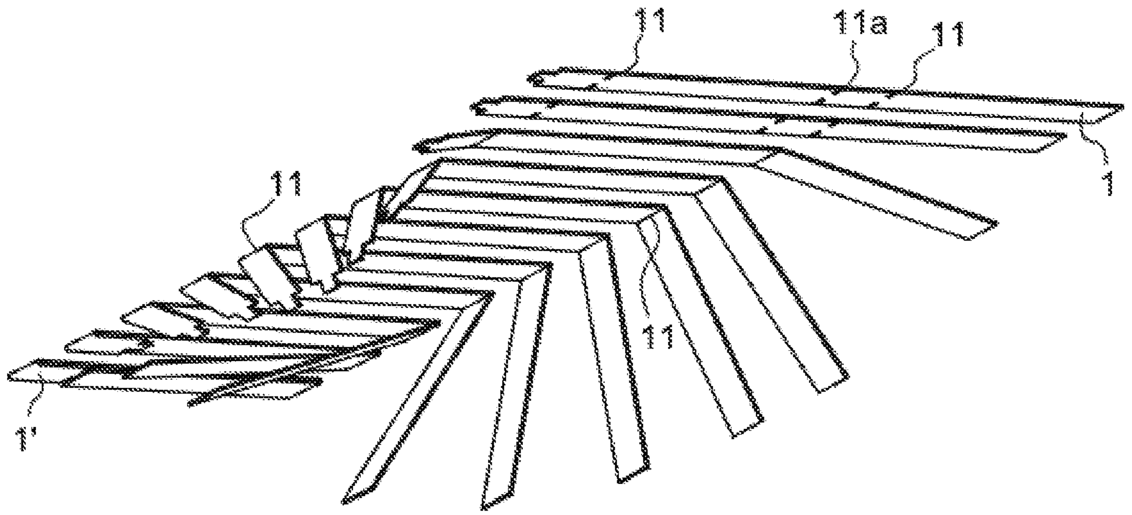
[Fig. 8a]
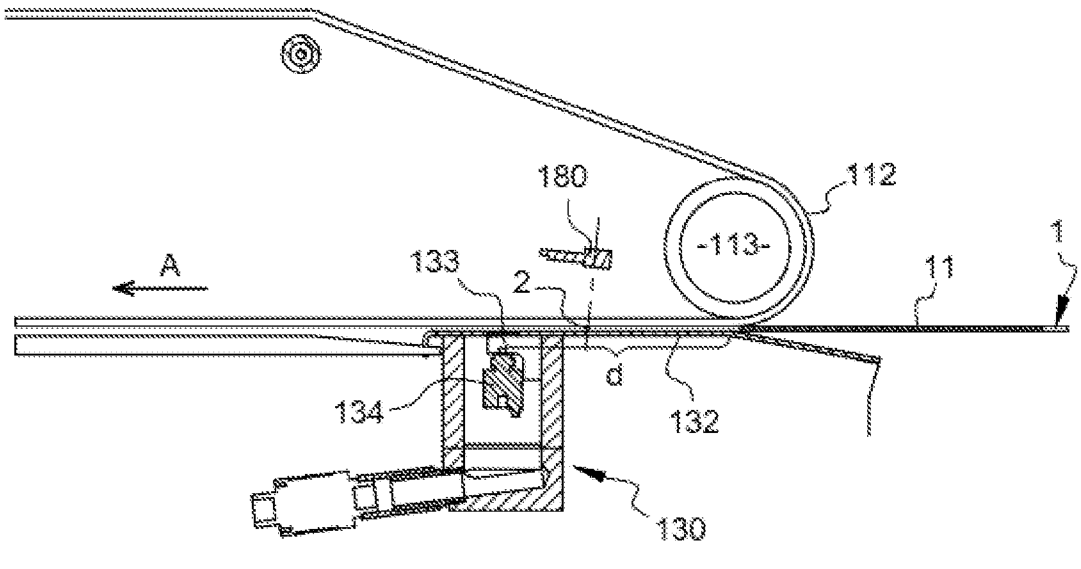
[Fig. 8b]

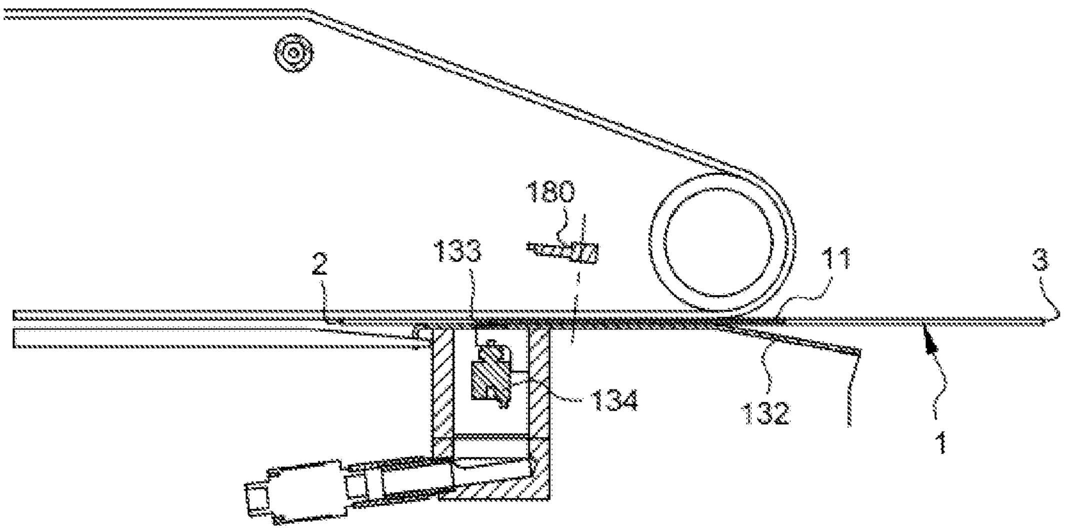
[Fig. 8c]
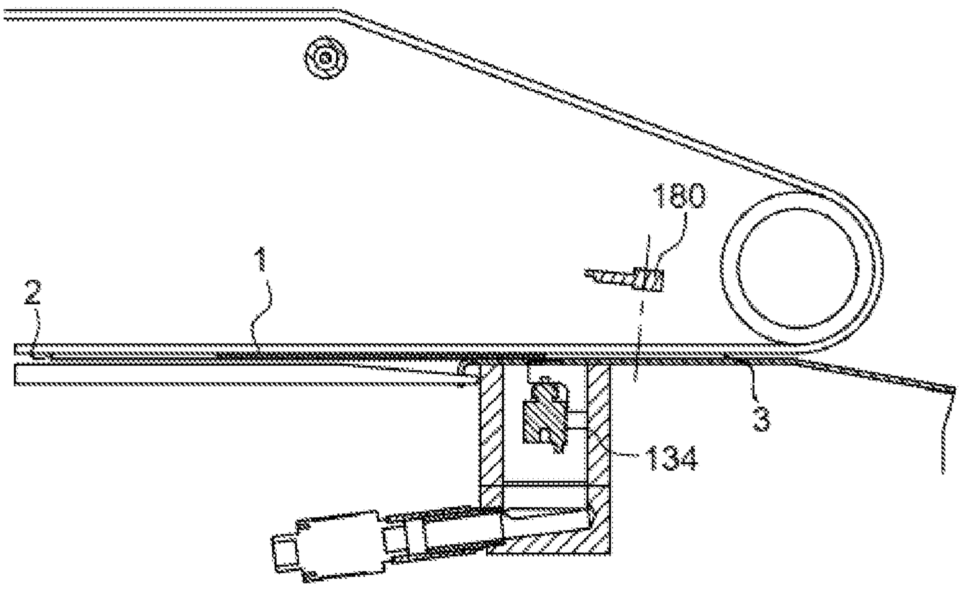

METHOD FOR FOLDING A CORRUGATED CARDBOARD BLANK INTENDED TO FORM A FOLDED BOX

CROSS-REFERENCE TO RELATED APPLICATION(S)

This application is a U.S. National Stage Application under 35 U.S.C. § 371 of International Application No. PCT/EP2020/069321, filed Jul. 9, 2020, which claims priority to French Patent Application No. 1907771, filed Jul. 11, 2019, the contents of all of which are incorporated by reference in their entirety.

The present invention relates to the field of manufacturing of packages, in particular packages made from cardboard blanks.

In particular, the present invention relates to a method and a machine which carries out, starting from a cardboard blank that is already creased, a folding of two lateral flaps, which are folded in the direction of a central line, with a partial overlapping of the outer edge of these flaps.

PRIOR ART

In the packaging industry, cardboard cases or boxes are often made from sheet elements in the form of sheets of cardboard or corrugated cardboard. The sheet elements can be processed in a continuous flow in a package making machine, where they are imprinted, cut to size, and creased, and then folded and assembled by gluing, so as to form the cases. In another type of packaging industry, the package making machine is a folding-gluing one, the sheet elements having been previously imprinted and cut to size.

In the package making machine, a folding-gluing unit performs combined operations of folding-gluing of cardboard blanks along a stretch following the longitudinal axis of the folding-gluing unit. During these operations for the processing of each cardboard blank, deviations in the position of the two flaps are regularly found, once they have been folded and glued, as compared to their desired position. These deviations may be caused, in particular, by an incorrect lateral alignment of the folding lines. This incorrect lateral alignment generally occurs on account of the rigidity of the cardboard and the presence of the corrugated support layer, which will align the position of the folding lines on the corrugations. During the folding of the lateral flaps of the cardboard blank onto the central flap, this incorrect lateral alignment produces a gap defect between the edges of the lateral flaps. This gap ultimately causes a deformation of the box.

To remedy this problem and limit the gap variations, documents US 2013/0184135 and WO 2017/121503 describe the application of a liquid by means of an ejection nozzle on the creases of the cardboard blank, prior to the folding step. This liquid in particular makes the material softer in the location of the crease, which assists in the folding and prevents an incorrect lateral alignment of the folding lines. However, this solution has the drawback of forming a drizzle when the liquid makes contact with the cardboard. This drizzle is then deposited on the portions of the machine situated in proximity to the ejection nozzle and mixes with the cardboard dust. The resulting mixture of solution and dust can therefore potentially clog the nozzle, resulting in poor or no application of the liquid to the creases and, hence, the gap defect, so that the ejection nozzle makes the subsequent folding ineffective. What is more, the resulting mixture of solution and dust is dispersed into the surroundings of the folding-gluing unit of the machine, which may cause a deterioration of the driving means.

SUMMARY OF THE INVENTION

The present invention thus intends to propose a method for folding a cardboard blank and a folding-gluing unit not having the aforementioned drawbacks.

One object of the invention deals in particular with a method for folding a corrugated cardboard blank intended to form a folded box, the method comprising the following series of steps:

i) supplying a blank comprising at least one longitudinal crease;

ii) applying a liquid to the longitudinal crease so as to make the corrugated cardboard more flexible at the location of the longitudinal crease, the application being performed by means of a liquid application arrangement comprising a liquid-ejection nozzle provided with a liquid outlet;

iii) folding the blank around the longitudinal crease;

wherein an aspiration of liquid is produced inside an aspiration compartment of the liquid application arrangement during step ii).

The aspiration makes it possible to remove any excess liquid which might not have been absorbed by the cardboard, whether or not accompanied by cardboard dust produced upstream from the folding-gluing unit or upon impact of the liquid with the cardboard.

The method of the invention may involve one or more of the following characteristics:

- the aspiration is produced in discontinuous manner,
- the excess aspirated liquid and/or the aspirated dust is evacuated to a liquid recovery tank,
- the method involves an additional step of cleaning the ejection nozzle so as to remove any deposit of liquid and/or dust at least partly covering the liquid outlet of the nozzle,
- the cleaning step is produced by blowing air in the area of the liquid outlet,
- the cleaning is done in discontinuous manner,
- the blowing of air is done by means of an air blower supplied with compressed air.

Another object of the invention likewise deals with a folding-gluing unit for the manufacture of folded boxes made of corrugated cardboard by implementing the folding method as described above, comprising:

- at least one driving device adapted to driving blanks of corrugated cardboard provided with at least one longitudinal crease,
- at least one conveyor adapted to move the blanks of corrugated cardboard in a longitudinal direction from the driving device,
- at least one liquid application arrangement adapted to apply a liquid to the longitudinal crease, the liquid application arrangement comprising an ejection nozzle provided with a liquid outlet, at least one aspiration device adapted to generate a negative pressure inside an aspiration compartment of the liquid application arrangement and adapted to aspirate the liquid,
- at least one folding device adapted to fold the blank around the longitudinal crease.

According to one variant, the application arrangement comprises a guide plate adapted to contact a bottom surface of the cardboard blanks. The guide plate may comprise an opening or a slit, through which the liquid ejected by the nozzle can emerge, and at least one aspiration opening adapted to aspirate the liquid and juxtaposed with the opening or slit.

The folding-gluing unit according to the invention may further comprise a cleaning device adapted to remove any deposit of liquid and/or dust at least partly covering the liquid outlet of the ejection nozzle. The cleaning device may comprise an air blower supplied with compressed air.

BRIEF DESCRIPTION OF THE FIGURES

The invention will be better understood with the help of the detailed description set forth below in regard to the appended figures, where:

FIG. 1A is a plan view of a cardboard blank;

FIG. 1B is a top view of a folded and glued box obtained from the blank represented in FIG. 1;

FIG. 2 is a perspective view of a folding-gluing unit adapted to manufacture folded boxes made of corrugated cardboard, starting from a cardboard blank according to FIG. 1;

FIG. 3 is an enlarged perspective view of a detail of the folding-gluing unit represented in FIG. 2;

FIG. 4 is a perspective view of the liquid application arrangement equipping the folding-gluing unit represented in FIG. 2;

FIG. 5 is a transverse cross section view along the median plane P of the liquid application arrangement represented in FIG. 4;

FIG. 6 is a schematic assembled view of the liquid application unit represented in FIG. 4 and the associated devices;

FIG. 7 is a perspective view of a cardboard blank as it undergoes processing in the folding-gluing unit of FIG. 2;

FIG. 8*a* is a transverse cross section view along the median plane P' of the folding-gluing unit as represented in FIG. 4, at the moment of introducing a new cardboard blank;

FIG. 8*b* is a view similar to FIG. 8*a*, at the start of the step of ejecting liquid onto the cardboard blank;

FIG. 8*c* is a view similar to FIG. 8*a*, at the end of the step of ejecting liquid onto the cardboard blank.

DETAILED DESCRIPTION OF THE INVENTION

FIG. 1 represents a cardboard blank 1 used for the manufacturing of a folded box 1', such as is represented in FIG. 2, and intended to feed a folding-gluing unit according to the invention. The cardboard blank 1 has a general rectangular shape in plan view with two sides of longer length, forming the front edge 2 for the side which is the first to enter the folding-gluing unit and the rear edge 3 for the side which is the last to enter the folding-gluing unit. As the blank 1 moves along in the folding-gluing unit in the direction of the arrow A, this front edge 2 and rear edge 3, being parallel to each other, are generally orthogonal to the longitudinal axis XX' of the folding-gluing unit. The two lateral sides of lesser length define the right edge 4 and the left edge 5, being parallel to each other and to the longitudinal axis XX' of the folding-gluing unit. The right edge 4 and the left edge 5 are respectively the lateral side situated respectively on the right and left of the longitudinal axis XX' of the folding-gluing unit. The left edge 5 has a slice along its end portions so as to define a tab 14 in the central portion of the left edge 5.

Two creases 12, parallel to the front and rear edges 2, 3, bound off a central portion 1*a* of the blank 1, which is designed to form the peripheral surface 21 of the folded box 1', the central portion 1*a* being situated between a rear portion 1*b*, which is designed to form the bottom surface 22 of the folded box 1', and a front portion 1*c*, which is designed to form the top surface 23 of the folded box 1'. The blank 1 further comprises two pairs of creases 11 and 11*a*, being parallel to the right and left edges 4, 5, as well as to the corrugations or flutes 10 of the corrugated support layer of the cardboard forming the blank 1. These creases 11, 11*a* extend over the entire width of the central portion 1*a*. One of the creases 11*a* adjoins the tab 14, while the other crease 11*a*, or central crease, is aligned with the longitudinal axis XX'. One of the creases 11 is situated between the right edge 4 and the central crease 11*a*, while the other crease 11 is situated between the left edge 5 and the central crease 11*a*, the distance separating the latter crease 11 from the central crease 11*a* being equal to the distance of the first crease 11 from the right edge 4.

In the prolongation of the creases 11 and of the central crease 11*a*, the rear and front portions 1*b*, 1*c* are sliced so as to form slits 13 extending for the entire width of the rear and front portions 1*b*, 1*c*. The slits 13 thus bound off respectively two pairs of flaps in each of the rear and front portions 1*b*, 1*c*, respectively, a first pair of large lower flaps 6*b*-6*b*', a second pair of large upper flaps 6*c*-6*c*', a first pair of small lower flaps 7*b*-7*b*' and a second pair of small upper flaps 7*c*-7*c*'. The large lower and upper flaps 6*b*, 6*c* and 6*b*', 6*c*' are situated respectively on either side of a large central flap 6*a* and 6*a*'. In similar fashion, the small lower and upper flaps 7*b*, 7*c* and 7*b*', 7*c*' are situated respectively on either side of a small central flap 7*a* and 7*a*'.

As illustrated in FIGS. 1 and 7, the creases 11 and 11*a* and their slits 13 will enable a folding of the blank 1 to produce a folded box 1' of rectangular shape, each crease 11 defining a fold line. The folded box 1', folded flat in the folding-gluing unit 100, emerges from the package making machine. This folded box 1' is obtained in particular by a 180° folding toward the inside of the blank 1 and about the fold lines 11 of a first assemblage formed by the flaps 6*a*, 6*b* and 6*c* and of a second assemblage formed by the flaps 7*a*', 7*b*' and 7*c*'. These first and second assemblages are designated respectively as the left flap and right flap, and the assemblage formed by the flaps 7*a*, 7*b*, 7*c* and 6*a*', 6*b*', 6*c*' is designated as the central portion. The large left central flap 6*a* accompanied by the large upper flap 6*c* and the large lower flap 6*b* is folded at 180° with respect to the left crease 11 and the small right central flap 7*a*' accompanied by the small upper flap 7*c*' and the small lower flap 7*b*' is folded at 180° with respect to the right crease 11.

FIG. 3 represents a folding-gluing unit 100 according to the invention. This folding-gluing unit 100 makes it possible to produce preforms 1', as previously defined, starting from cardboard blanks 1 having a configuration similar to that represented in FIG. 1. This folding-gluing unit 100 comprises in particular a first folding module 101 situated on the left of a longitudinal axis XX' and a second folding module 102 situated on the right of the longitudinal axis XX', the first and second folding modules 101, 102 being symmetrical to each other with respect to the axis XX'.

Each of the folding modules 101, 102 comprises in particular an upper driving device or conveyor 110 designed to continuously drive the blanks 1. As represented in FIG. 3, this upper driving device 110 comprises in particular a conveyor belt 112 situated above a plurality of conveying rollers 114 and at a sufficient spacing from the conveying rollers 114 to allow the passage of a blank 1 between their outer surface. Motors are provided to drive the conveying rolls 113 (see FIG. 8*b*) in rotation, the conveyor belt 112 being wrapped around them, thus allowing the translational movement of the conveyor belt 112. The combined action of the conveyor belt 112 and the conveying rollers 114 thus enables a driving of each blank 1 in translation along the direction A.

Furthermore, a conveyor 120 is arranged beneath the upper driving device 110. The conveyor 120 and the upper driving device 110 are adapted to move the blanks 1 in the longitudinal direction A up to an exit 150 of the folding-gluing unit 100. As in the configuration shown, this conveyor 120 may comprise an endless belt on which the blanks 1 lie. During their movement up to the exit 150, the blanks 1 are processed by a folding device 140, which is adapted to fold the left and right flaps of the blank 1 at 180° against the central portion thereof.

This folding device 140 may comprise in particular a spiral folding conveyor (not shown), formed by bars and belts equipped with groups of pusher dogs and describing a curve, where the torsion is proportional to the curvature, the axis of the spiral coinciding with the folding axis. This folding device 140 is adapted in particular to produce a folding of the blanks 1 about their longitudinal creases 11. In order to assist this folding, each folding module 101 and 102 of the folding-gluing unit 100 is equipped with a liquid application arrangement 130 designed to apply a liquid to one of the longitudinal creases 11 just prior to the folding of the blanks 1. Thus, the arrangement 130 is advantageously positioned at the entrance of the upper driving device 110 and the folding device 140.

As represented in FIGS. 4 to 6, the liquid application arrangement 130 comprises a housing 131 inside which is lodged a liquid-ejection nozzle 134 fed with liquid via a conduit 171 connected at one of its ends to an inlet opening 137 of the nozzle 134 and at another end to a reservoir of liquid 172. The nozzle 134 has an outlet opening 138 through which the liquid is ejected. This opening 138 is directed toward a guide plate 132 which is secured to the housing 131 by means of screws. The guide plate 132 is advantageously arranged so as to be parallel to the direction of movement A of the blanks 1 and it makes contact with the bottom surface of the blanks 1, thus enabling a guiding of the blanks 1 during their movement. The plate 132 is furthermore provided with an opening or slot 133 through which the liquid ejected by the nozzle 134 can escape. This slot 133 is positioned to be aligned with one of the longitudinal creases 11 of the blanks 1 during their movement along the plate 132. In the example shown, the plate 132 is arranged beneath the blanks 1 (see FIGS. 4 and 5). However, in another possible configuration of the invention, the liquid application arrangement 130 with the plate 132 may be placed above the blanks 1.

Moreover, the liquid application arrangement 130 is equipped with a device in the form of an air blower 135 integrated with the housing 131 and arranged so as to project into the interior of a central cavity 136 of the housing 131. An air circulation duct 135*b* passes through the air blower 135 and is in fluidic communication with a duct 135*a* passing through the housing 131 and emerging on the outside. This duct 135*a* may thus be connected to a source of compressed air 173 so as to allow a projecting of compressed air into the central cavity 136 by means of the air blower 135. The duct 135*b* is advantageously oriented so as to project air onto the outlet opening 138 of the ejection nozzle 134 and, thus, to allow a cleaning of the outlet opening 138 when this outlet opening 138 is partly clogged with deposits of dust or other solid material, preventing the proper functioning of the ejection nozzle 134. This cleaning step is preferably performed when the ejection nozzle 134 is not in the process of ejecting liquid so as not to disturb the direction of the liquid stream ejected by the ejection nozzle 134.

In the prolongation of the housing 131 there is situated an aspiration device 160 comprising an intermediate compartment 161 and an aspiration compartment 163 designed to generate a negative pressure inside the intermediate compartment 161. This negative pressure may be created continuously by the Venturi effect generated by an arrival of accelerated air 174 inside the aspiration compartment 163. A measurement of the air flow velocity has shown a minimum value of 12 m/s at the Venturi aspiration exit.

The intermediate compartment 161 is secured at the lower end of the housing 131 by means of screws cooperating with a plurality of threads 139 formed in the area of the end. The intermediate compartment 161 furthermore has a vertical duct 162 passing through it and emerging on one side in the central cavity 136 of the housing 131 and on the other side in a substantially horizontal duct 164. A tubular junction element 166 is fitted onto one free end of the duct 164. An upstream opening 167 of the aspiration compartment 163 is plugged into the tubular junction element 166. Thus, the aspiration compartment 163 makes it possible to create a negative pressure inside the duct 164 and, consequently, inside the duct 162 and the central cavity 136. This negative pressure engenders an aspiration flow f from the interior of the central cavity 136 toward the upstream opening 167. This aspiration flow f thus allows an evacuating of any excess liquid ejected by the nozzle 134 and falling back inside the central cavity 136 without being absorbed by the blanks 1. This excess liquid aspirated through the upstream opening 167 is then evacuated by a downstream opening 168 of the aspiration compartment 163 to a liquid recovery tank 175.

As represented in FIG. 5, the guide plate 132 has an opening or slot 133. The ejection of liquid by the nozzle may thus pass through the opening 133. Consequently, the ejection nozzle 134 and the liquid ejection opening 133 are connected in fluidic manner. In one variant, the same opening 133 may be used to aspirate the excess liquid. To make this possible, the ejection and the aspiration can be done discontinuously and in alternation. For example, the ejection of liquid is only activated upon passage of a cardboard blank 1. Alternatively, the aspiration may be adapted to be only activated upon stoppage of the folding-gluing unit 100.

In another variant, the guide plate 132 has at least one aspiration opening 169, different from the opening 133, which allows aspirating the excess liquid ejected onto the cardboard blank 1. The aspiration opening 169 thus helps prevent a deposition of liquid in the folding-gluing unit 100. As illustrated, the aspiration device 160 comprises at least one aspiration opening 169, advantageously at least two juxtaposed aspiration openings 169 arranged on either side of the liquid ejection opening 133. It is also possible to arrange several aspiration openings 169 distributed around the opening 133.

FIGS. 8*a* to 8*c* represent the respective positions of a cardboard blank 1 in the folding-gluing unit 100 represented in FIG. 3 during several successive processing steps prior to its folding. In the position represented in FIG. 8*a*, the cardboard blank 1 has been introduced into the folding-gluing unit 100 in the area of the upper driving devices 110 of the first and second folding modules 101 and 102 and it has moved in the direction A, in particular under the action of the conveyor belt 112, until its front edge 2 is detected by an optical detector 180 arranged perpendicular to the guide plate 132 of the liquid application arrangement 130. In this position, one of the longitudinal creases 11 of the cardboard blank 1, destined to form a fold line, is aligned with the slot 133 of the plate 132. The crease is furthermore separated from the slot 133 by a distance d. This distance d is constant for the same type of blank. Depending on the speed of advancement v of the blanks 1 inside the folding-gluing unit 100, a controller responsible for triggering the command for ejection of the nozzle 134 schedules the next ejection of liquid at a future time t, t being equal to the ratio of d to v.

In the position represented in FIG. 8*b*, the blank 1 has moved in the direction A from the position represented in FIG. 8*a*, thus along the aforementioned distance d. In this position, the front end of the longitudinal crease 11 is aligned with the slot 133. The controller is about to act, or has just acted, on the ejection nozzle 134 to produce an ejection of liquid in the area of the slot 133 and in the direction of the crease 11.

In the position represented in FIG. 8*c*, the blank 1 has moved in the direction A from the position represented in FIG. 8*b*, so as to align the rear end of the longitudinal crease 11 with the slot 133. Thus, the crease 11 has been subjected to the liquid jet delivered by the ejection nozzle 134 during its entire movement from its position in FIG. 8*b* to its current position. The controller is about to act, or has just acted, on the ejection nozzle 134 to halt the ejection of liquid in the area of the slot 133.

After this, the blank 1 will continue its movement in the direction A until the front edge 2 of the immediately following new cardboard blank 1 is detected by the optical detector 180. This detection will tell the controller that it can trigger the next ejection of liquid onto this new cardboard blank 1.

The invention claimed is:

1. A method for folding a corrugated cardboard blank intended to form a folded box, the method comprising:
- supplying the corrugated cardboard blank comprising at least one longitudinal crease;
- applying a liquid to the at least one longitudinal crease so as to make the corrugated cardboard blank more flexible at a location of the at least one longitudinal crease, by a liquid application arrangement comprising a housing comprising a conduit and a liquid-ejection nozzle provided with a liquid inlet and a liquid outlet, the conduit connecting the liquid inlet with a liquid reservoir; and
- folding the corrugated cardboard blank around the at least one longitudinal crease;
- wherein an aspiration of excess liquid passes through an opening in a guide plate covering the housing and is produced inside an aspiration compartment of the liquid application arrangement during the applying the liquid.

2. The method according to claim 1, wherein the aspiration is produced in a discontinuous manner.

3. The method according to claim 1, wherein the excess aspirated liquid and/or aspirated dust is evacuated to a liquid recovery tank.

4. The method according to claim 1, further comprising:
- cleaning the liquid-ejection nozzle so as to remove any deposit of liquid and/or dust at least partly covering the liquid outlet of the liquid-ejection nozzle.

5. The method according to claim 4, wherein the cleaning is performed by blowing air in an area of the liquid outlet.

6. The method according to claim 5, wherein the blowing of air is done by an air blower supplied with compressed air.

7. The method according to claim 4, wherein the cleaning is done in a discontinuous manner.

8. The method of claim 1, wherein a negative pressure for creating the aspiration is generated using the Venturi effect.

9. The method of claim 1, wherein the liquid-ejection nozzle ejects liquid toward a bottom of the blank.

10. A folding-gluing unit for manufacturing a folded box made of corrugated cardboard, the folding-gluing unit comprising:
- at least one driving device adapted to driving a blank of corrugated cardboard provided with at least one longitudinal crease,
- at least one conveyor adapted to move the blank of corrugated cardboard in a longitudinal direction from the at least one driving device,
- at least one liquid application arrangement adapted to apply a liquid to the at least one longitudinal crease, the application arrangement comprising a liquid-ejection nozzle provided with a liquid outlet, and at least one aspiration device adapted to generate a negative pressure inside an aspiration compartment of the at least one liquid application arrangement and adapted to aspirate liquid, and
- at least one folding device adapted to fold the blank of corrugated cardboard around the at least one longitudinal crease, wherein
- the liquid-ejection nozzle and the aspiration device are on a same side of the blank.

11. The folding-gluing unit according to claim 10, further comprising:
- a cleaning device adapted to remove any deposit of liquid and/or dust at least partly covering the liquid outlet of the liquid-ejection nozzle.

12. The folding-gluing unit according to claim 11, wherein the cleaning device comprises an air blower supplied with compressed air.

13. The folding-gluing unit of claim 10, wherein the liquid-ejection nozzle and the aspiration device are below the blank.

14. The folding-gluing unit of claim 13, wherein the liquid-ejection nozzle ejects liquid toward a bottom of the blank.

15. The folding-gluing unit of claim 13, further comprising a guide plate including at least one aspiration opening for aspirating liquid from below the blank.

16. The folding-gluing unit of claim 15, wherein the guide plate is below the blank and guides the blank along a dimension parallel to a longitudinal dimension of the guide plate.

17. A folding-gluing unit for manufacturing a folded box made of corrugated cardboard, the folding-gluing unit comprising:
- at least one driving device adapted to drive a blank of corrugated cardboard provided with at least one longitudinal crease,
- at least one conveyor adapted to move the blank of corrugated cardboard in a longitudinal direction from the at least one driving device,
- at least one liquid applicator adapted to apply a liquid to the at least one longitudinal crease, the liquid applicator comprising:
  - a housing comprising a guide plate with a liquid outlet;
  - a liquid-ejection nozzle configured to eject liquid through the liquid outlet; and,
  - an aspiration device adapted to generate a negative pressure inside an aspiration compartment of the at least one liquid applicator and adapted to aspirate liquid from between the guide plate and the blank, and a folding device adapted to fold the blank of corrugated cardboard around the at least one longitudinal crease, wherein the liquid-ejection nozzle ejects liquid at a bottom side of the blank.

18. The folding-gluing unit of claim 17, wherein the liquid ejection nozzle and the aspiration device are on a same side of the blank.

19. The folding-gluing unit of claim 18, wherein the liquid ejection nozzle and the aspiration device are below the blank.

20. The folding-gluing unit of claim 19, wherein the aspiration device generates a negative pressure using the Venturi effect.

* * * * *